A. J. CURTIS.
CAR-STARTER.

No. 191,839.  Patented June 12, 1877.

WITNESSES:
H. Rydquist
J. H. Scarborough

INVENTOR:
A. J. Curtis
BY
ATTORNEYS.

UNITED STATES PATENT OFFICE.

ANDREW J. CURTIS, OF MONROE, MAINE.

IMPROVEMENT IN CAR-STARTERS.

Specification forming part of Letters Patent No. 191,839, dated June 12, 1877; application filed April 9, 1877.

*To all whom it may concern:*

Figure 1:
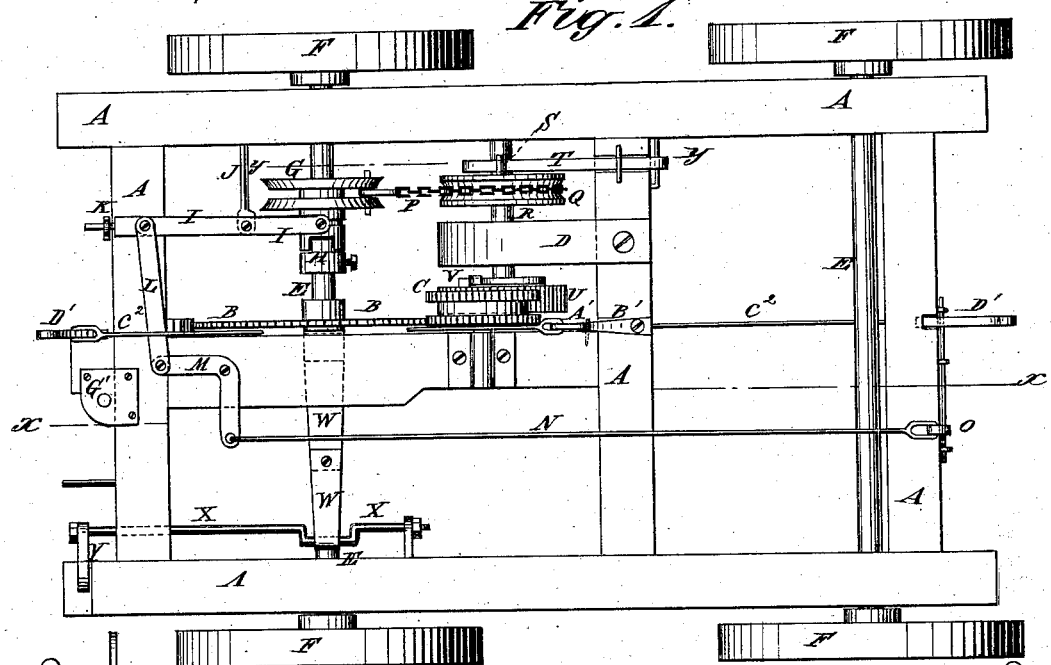
Figure 2:
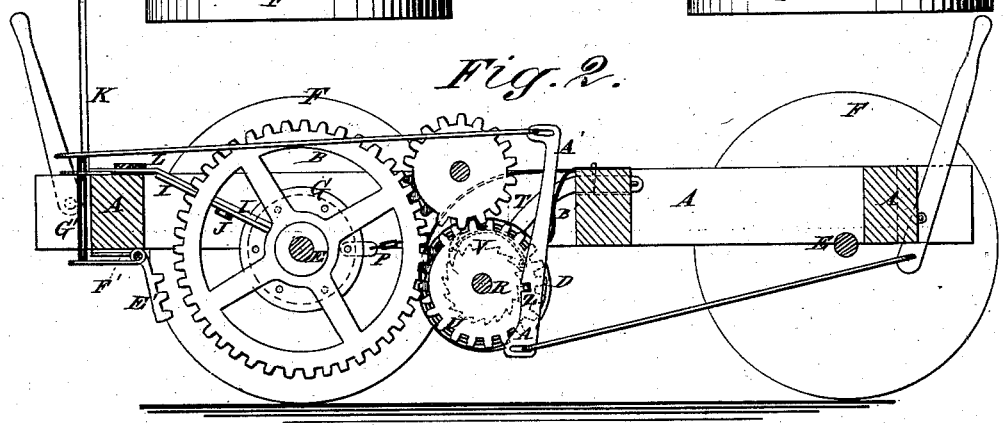
Figure 3:
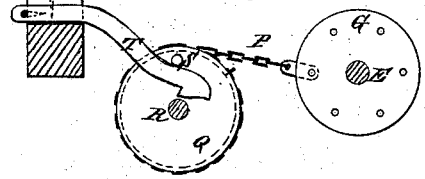

Be it known that I, ANDREW J. CURTIS, of Monroe, in the county of Waldo and State of Maine, have invented a new and useful Improvement in Car-Starter, of which the following is a specification:

Figure 1 is a top view of my improved device shown as applied to the frame and running-gear of a car. Fig. 2 is a vertical longitudinal section of the same taken through the line $x\,x$, Fig. 1. Fig. 3 is a detail section taken through the line $y\,y$, Fig. 1.

Similar letters of reference indicate corresponding parts.

The object of this invention is to furnish an improved device for attachment to street-cars, which shall be so constructed as to enable the momentum of the car to be used for stopping it, and the same power to be applied for starting it, and which shall be simple in construction and conveniently operated.

The invention will first be described in connection with the drawing, and then pointed out in the claims.

A is the frame of the car, to which are attached the boxes in which the journals of the axles E revolve. To the ends of the axles E are attached the wheels F. G is a loose chain-wheel placed upon one of the axles E, and having clutch-teeth formed upon one end of its hub to engage with a clutch, H, attached to said axle, so that said axle may be made to carry the said chain-wheel with it in its revolution when desired.

The hub of the chain-wheel G has a ring-groove formed in it to receive the end of the clutch-lever I, which is pivoted to a support, J, attached to the frame A, and to the other end of which is pivoted the lever K. The lower end of the lever K is pivoted to the frame A, and its upper end projects into such a position that it may be conveniently reached and operated by the driver. The clutch-lever I is also connected by a bar, L, elbow-lever M, and rod N, with a lever, O, pivoted at the other end of the car, so that the chain-wheel G can be thrown into and out of gear with the clutch H from either end of the car.

To the chain-wheel G is attached one end of the chain P, which is wound around and has its other end attached to the chain-wheel Q. The chain-wheel Q is attached to the shaft R, which revolves in bearings attached to the frame A, and to which is attached the end of the spring D. The spring D is coiled around the shaft R, and its other end is attached to the frame A.

To the side of the chain-wheel Q is attached a pin, S, which, as the said wheel is turned, strikes against the upper side of a latch, T, or against a hook formed upon the lower side of said latch, and thus prevents the wheel Q from turning farther than a single revolution in either direction.

Upon the shaft R is placed a gear-wheel, U, which is connected with it by a pawl and ratchet-wheel, V, in such a way that the shaft R may be turned in the direction to coil the spring D without turning the wheel U, but cannot be turned by the uncoiling of the said spring without carrying the said wheel U with it.

To the frame A is pivoted a double gear-wheel, C C$^1$, the part C of which meshes into the gear-wheel U.

B is a large gear-wheel placed upon the axle E and connected with it in such a way that they will turn together, and that the wheel B may be slid longitudinally upon the said axle E, to throw it into gear with the gear-wheel U, or with the part C$^1$ of the double gear-wheel, as required.

The hub of the gear-wheel B has a ring-groove formed in it to receive the forked end of the connecting rod or bar W, the other end of which is pivoted to a crank formed upon the rod X. The rod X works in bearings attached to the frame A, and has an arm, Y, attached to its forward end, which arm Y serves as a handle for operating the crank-rod X, and as a stop for limiting the movement of the said crank-rod by striking against pins, shoulders, or other stops formed upon or attached to the frame A.

To the side of the gear-wheel U is attached a pin, Z, to enter a notch in a catch-lever, A$'$, to stop the gear-wheels U and C C$^1$ always in the same position, and to lock them against the action of the spring D until ready to start. The lever A$'$ is pivoted to the frame A, and is held forward by a spring, B$'$, attached to said frame A.

To the upper and lower ends of the catch-lever A' are attached the inner ends of two rods, C², which extend to the opposite ends of the car, and are attached to two levers, D', so that the catch-lever A' may be tripped from either end of the car.

E' is a lever-pawl, which is pivoted to the frame A, is held back by a spring, F', and with its outer end is connected a push-pin, G', passing down through a guide attached to the frame A, so that the driver, by pressing the pin G' down with his foot, can force the pawl E' against the gear-wheel B and stop the wheels when a person is entering or leaving the car.

A few of the teeth of the gear-wheels U and C¹ upon the side next the gear-wheel B, when the said gear-wheels U C¹ are locked by the catch A', are cut away, so that the gear-wheel B can be turned by the advance of the car without turning the gear-wheels U C¹.

In using the machine the gear-wheel B is adjusted to mesh into the gear-wheel U or C¹, according as one or the other end of the car is to be drawn forward. If the car is to be always drawn with the same end forward, the double gear-wheel C C¹ is not required.

When the car is to be stopped the chain-wheel G is thrown into gear with the clutch H, so that the momentum of the car may be used to coil the spring D, and then to hold the wheels until the car is stopped. The chain-wheel G is thrown out of gear with the clutch H, and the spring D is held in coil by the lever catch.

When the car is to be started the catch-lever A' is withdrawn, which allows the tension of the spring D to be applied to start the car.

Having thus described my invention, I claim as new, and desire to secure by Letters Patent—

1. The combination of the clutch H, the chain-wheels G Q, the chain P, the coiled spring D, the pawl and ratchet-wheel V, and the gear-wheels U B, with each other, and with the axle E and the frame A of a car, substantially as herein shown and described.

2. The combination of the clutch H, the chain-wheels G Q, the chain P, the coiled spring D, the pawl and ratchet-wheel A, the gear-wheels U B, and the double gear-wheel C C¹, with each other, and with the axle E and the frame A of a car, substantially as herein shown and described.

3. The combination of the lever-pawl E', the spring F', and the push-pin G', with the gear-wheel B of the axle E, substantially as herein shown and described.

ANDREW J. CURTIS.

Witnesses:
 F. L. PALMER,
 T. DURHAM.